June 26, 1945.  B. J. CRAIG  2,379,341
VEHICLE FENDER
Original Filed Feb. 12, 1940   3 Sheets-Sheet 1
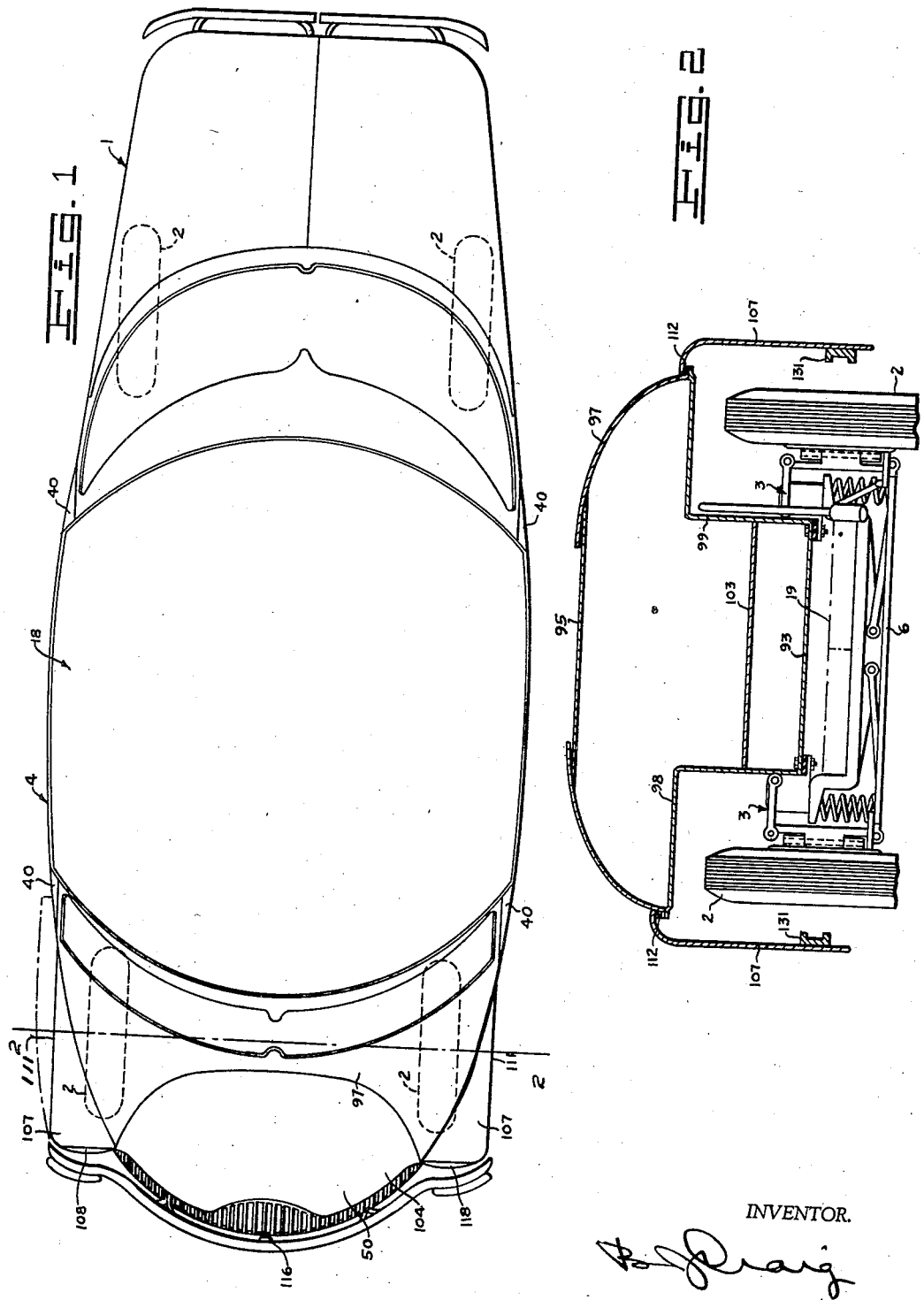
INVENTOR.
B. J. Craig June 26, 1945.					B. J. CRAIG					2,379,341
VEHICLE FENDER
Original Filed Feb. 12, 1940			3 Sheets-Sheet 2
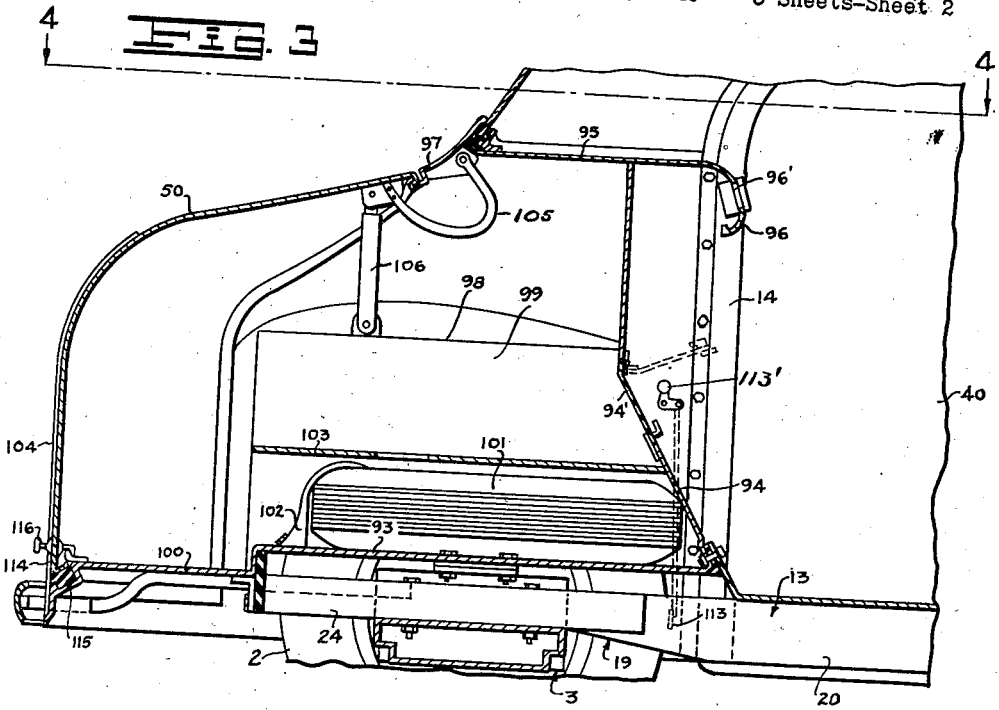
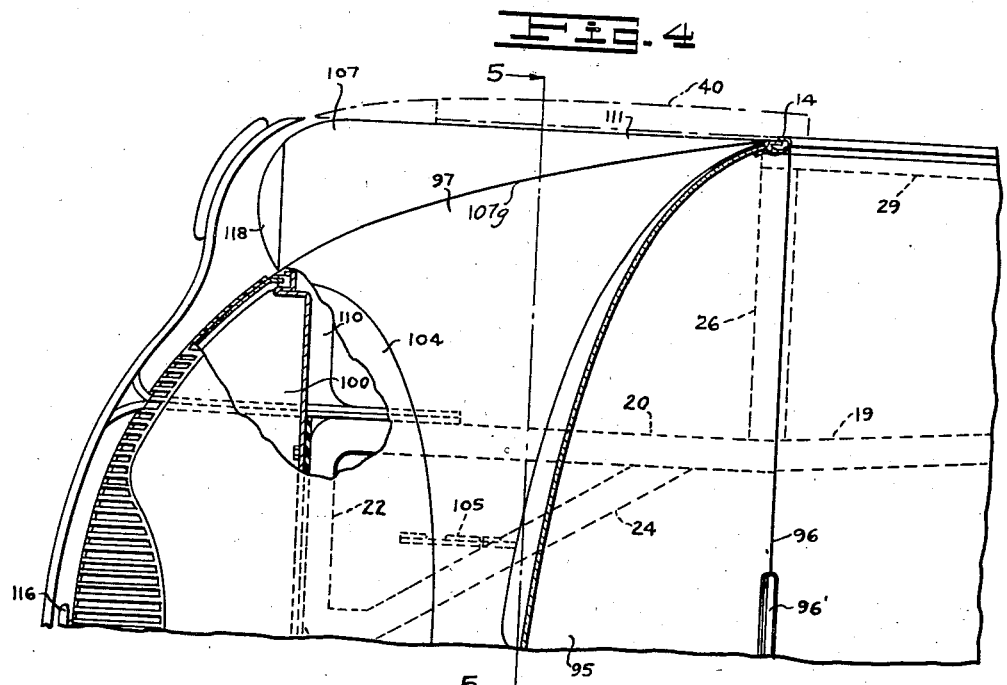
INVENTOR.

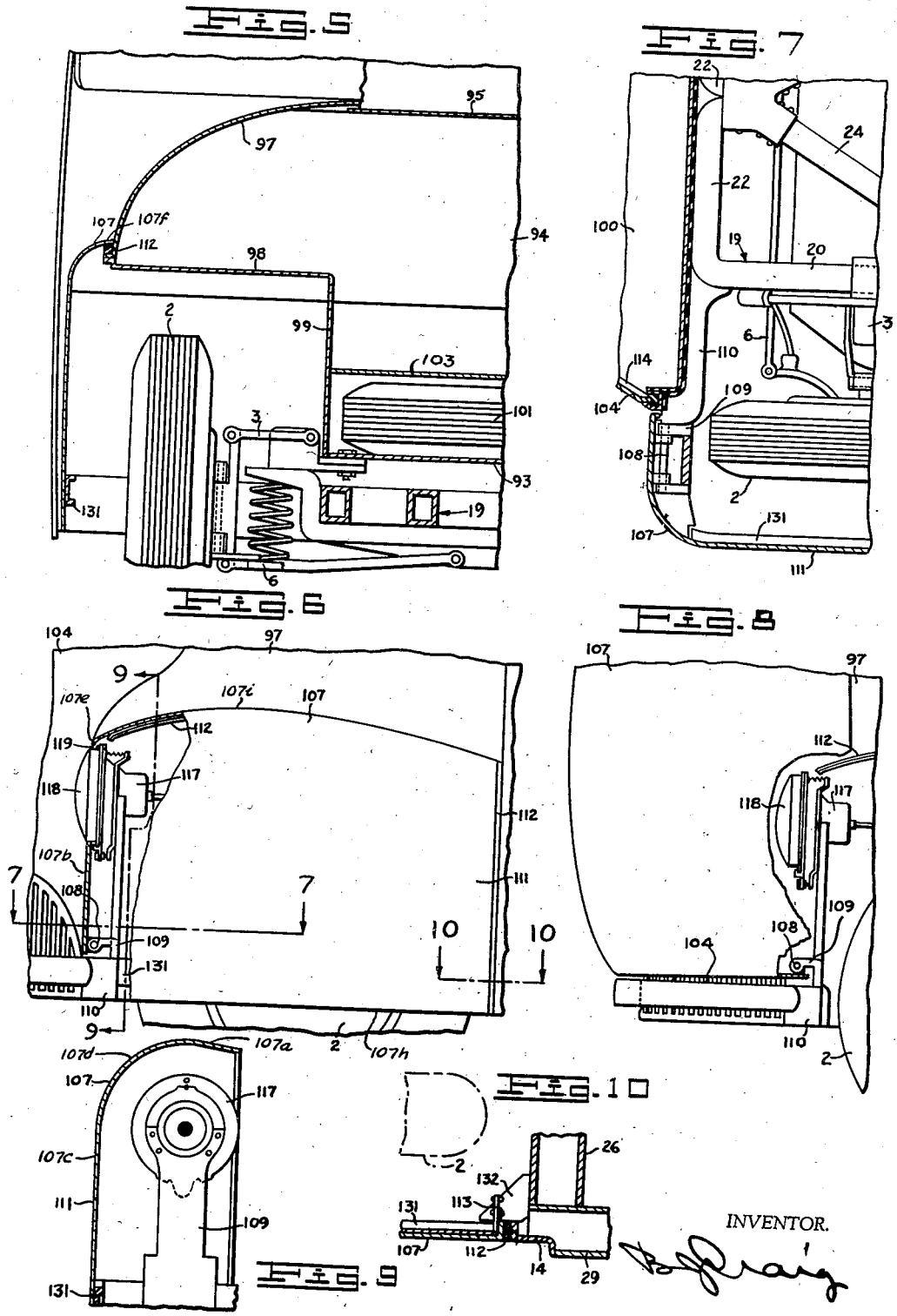
June 26, 1945.  B. J. CRAIG  2,379,341
VEHICLE FENDER
Original Filed Feb. 12, 1940  3 Sheets-Sheet 3
INVENTOR.

Patented June 26, 1945

2,379,341

UNITED STATES PATENT OFFICE 2,379,341

VEHICLE FENDER

Burnie J. Craig, Los Angeles, Calif.

Original application February 12, 1940, Serial No. 318,397. Divided and this application April 17, 1944, Serial No. 531,454

7 Claims. (Cl. 280—153)

This invention relates to a vehicle fender.

The general object of the invention is to provide an improved fender construction which is particularly adapted for use on automotive vehicles.

A more specific object of the invention is to provide an automotive vehicle including a fender which serves as a closure for a wheel housing.

An additional object of the invention is to provide an automotive vehicle body including a fender with a novel concealed bumper therein.

A further object of the invention is to provide an automotive vehicle including novel means for affording access to the vehicle headlight.

Other objects and advantages of this invention will be apparent from the following description taken in connection with the accompanying drawings, wherein:

Fig. 1 is a top plan view showing an automotive vehicle embodying the features of this invention;

Fig. 2 is a section taken on line 2—2, Fig. 1;

Fig. 3 is a fragmentary, central, sectional view through the hood member;

Fig. 4 is a fragmentary section taken on line 4—4, Fig. 3, with parts broken away;

Fig. 5 is a fragmentary section taken on line 5—5, Fig. 4;

Fig. 6 is a side elevation showing the front fender and hood with parts broken away;

Fig. 7 is a fragmentary section taken on line 7—7, Fig. 6;

Fig. 8 is a fragmentary side elevation showing the front fender lifted and with parts broken away;

Fig. 9 is a fragmentary section taken on line 9—9, Fig. 6 and

Fig. 10 is a fragmentary section taken on line 10—10, Fig. 6.

This application is a division of application Serial No. 318,397, filed February 12, 1940, now Patent No. 2,349,940, issued May 30, 1944.

Referring to the drawings by reference characters, the invention is shown as embodied in an automotive vehicle which is indicated generally at 1. The vehicle includes wheels 2 which in the disclosure are mounted at the front on steerable wheel mountings 3 shown as of the "knee action" type and which support a body 4. The wheel mountings in front are disclosed as steered by mechanism 6 which is suitably connected to the wheels and is actuated by means of the usual steering wheel.

As shown the body includes a lower frame member 13 which supports front door and windshield pillars 14. The body includes a top 18.

As shown the frame includes members 19 each having a side rail 20. Each rail 20 has a front member 22 secured thereto. The members 22 are shown as braced by diagonal members 24.

Each rail 20 further includes outwardly directed hangers 26 which support outer rail members 29 which latter in turn support the pillars 14 previously mentioned. The body includes doors 40 which when open may move to the position shown in dotted lines in Fig. 1.

The front hood 50 includes a bottom portion 93 which is mounted on the frame and also includes an upwardly extending partition 94 which is surmounted by a top portion 95 having a dash member 96 thereon which may include the usual instruments 96'. The partition 94 includes a door 94' to provide access to the storage space which is provided by the hood.

The hood includes a cowling 97 which in the disclosure extends downwardly and outwardly with the lower portion thereof secured to a top 98 of a wheel housing which includes a vertically disposed panel 99 connected to the bottom portion 93. The bottom portion 93 includes a step portion 100 which extends across the hood. The bottom 93 forms a support for a spare tire 101 which may be secured in place by suitable brackets 102. A partition 103 in the hood forms the bottom of a storage compartment.

The hood is closed by a closure member 104 which is mounted on a concealed hinge 105. A pivoted arm 106 mounted on the top 98 of the wheel housing engages the hood when the latter is raised to thereby hold it in this position.

Each wheel housing is closed by a fender 107 which is pivoted on a shaft 108 mounted on brackets 109 secured to a support 110 mounted on the front end of the frame. Each fender includes a top portion 107a, a front portion 107b and a side portion 107c. The side portion is connected to the top portion by an arcuate portion 107d and the front portion is connected to the top portion as at 107e. The entire upper edge portion 107f is directed towards the cowling 97 and the entire inner edge is curved as at 107g. The lower edge of each fender is straight and horizontally arranged as at 107h. Each fender has a crown 107i.

The axes of the shafts 108 are horizontal and are at the leading edge of the fenders so that the fenders may be raised to the position shown in Fig. 8. The center of gravity of each fender when in fully raised position is in advance of the pivot so that the fender will remain in the fully raised position. The fenders shown include plane outer faces 111. The fenders 107 engage cushion strips 112 on the cowling 97. Catch members 113 including hand operated release members 113' accessible from within the passenger compartment serve to hold the fenders in closed position so that unauthorized removal of the tires or headlights (to be later described) is prevented.

The hood closure 104 includes a lower flange 114 which when the hood is closed (see Fig. 3) engages a cushion member 115 on the step portion 100 of the hood bottom. The hood is shown as held in closed position by hand released fastening means 116. The support 109 supports a standard headlight 117 which includes a lens 118. The fender includes an aperture 119 (see Fig. 6) which receives the lens 118. It will be seen that when the fender 107 is raised (see Fig. 8), access may be had to the adjacent front wheel and the adjacent headlight.

The front fenders 107 include crash bumpers 131 which are secured to the inside thereof. The bumpers 131 terminate forwardly adjacent the supports 110 and rearwardly they terminate adjacent the pillars 14. Impact on a bumper 131 is transmitted to the frame through the support 110 and through a corner member 132 secured to the hanger 26.

Having thus described my invention, I claim:

1. In an automotive vehicle body having a front portion, a headlight mounted adjacent the front portion of the body, a fender on said body, the fender including a portion disposed about the headlight and having an aperture disposed in alignment with the headlight lens, and means to pivotally mount the fender for movement away from the headlight to allow access to the headlight, the axis of the pivotal mounting being lower than the axis of the headlight.

2. An automotive vehicle including a front end portion having a wheel housing at each side disposed at least partially therein, a fender at each side of the vehicle, means adjacent to the leading end of each fender to pivotally mount the fender on the end portion, the axes of the pivotal mountings extending substantially horizontally, each fender including a portion forming an outer wall for the adjacent wheel housing, each fender when shifted about its pivots to one position allowing access to a wheel in the adjacent housing.

3. An automotive vehicle body having a front end portion and having a wheel housing at each side disposed at least partially in the end portion, a fender for each side, each fender including a top, side, and front portion and each fender forming a closure for the adjacent wheel housing, and means at the leading end of each fender to pivotally mount the fender for movement to a location to allow access to a wheel in the adjacent housing, the axes of the pivots being substantially horizontally disposed.

4. An automotive vehicle including a frame member and a body having a front end portion and having a wheel housing at each side disposed at least partially in the end portion, a fender support means at each side of the frame, a fender on each side of the body, means to pivotally mount each fender on the support means, the pivotal support means being disposed at the leading end of the fender, the axis of each pivot extending substantially horizontally, each fender including a portion which, when the fender is closed, forms a closure for the adjacent wheel housing, each fender when shifted allowing access to a wheel in the adjacent housing, and means to secure each fender in close position.

5. An automatic vehicle having a support thereon, a headlight, a fender, means to pivotally mount the fender on the support, the axis of the pivotal mounting being adjacent to the leading edge of the fender, the fender including an aperture disposed in alignment with the headlight, the fender mounting permitting its movement away from the headlight to allow access to the headlight.

6. In an automotive vehicle including a front end portion, a headlight, means to mount the headlight on the front end portion, a fender, and means to pivotally support the fender on the front end portion, the axis of the pivotal mounting being located in the forward portion of the front end portion and in the leading portion of the fender, the fender including an aperture disposed in alignment with the headlight, the fender being movable away from the headlight to allow access to the headlight.

7. An automatic vehicle construction including a frame, a body on the frame, said body having a wheel housing disposed at least partially in one end portion thereof, a fender, means on the frame to pivotally support the fender, said fender including a portion, which, when in normal position, forms an outer wall for the wheel housing to obstruct removal of the wheel, a headlight, means to support the headlight on the frame, the fender, in normal position being disposed about the headlight and including a portion obstructing removal of the headlight, the fender having an aperture in alignment with the path of light from the headlight lens, and latch means to normally prevent movement of the fender from its normal position.

BURNIE J. CRAIG.